United States Patent [19]
Yamamoto et al.

[11] Patent Number: 6,009,849
[45] Date of Patent: Jan. 4, 2000

[54] DIRECT FUEL INJECTION ENGINE

[75] Inventors: Hiroyuki Yamamoto, Hiroshima; Hidetoshi Kudo, Higashi-Hiroshima; Noriyuki Ota, Hiroshima; Masayuki Kuroki, Hatsukaichi; Akira Kageyama, Hiroshima; Hiroyuki Yamashita, Hiroshima; Takehiko Yasuoka, Hiroshima, all of Japan

[73] Assignee: Mazda Motor Corporation, Hiroshima-ken, Japan

[21] Appl. No.: 08/909,404

[22] Filed: Aug. 11, 1997

[30] Foreign Application Priority Data

Aug. 12, 1996 [JP] Japan .................................. 8-212784
Aug. 12, 1996 [JP] Japan .................................. 8-212785
Aug. 12, 1996 [JP] Japan .................................. 8-212786

[51] Int. Cl.[7] .............................. F02B 3/00; F02B 5/00
[52] U.S. Cl. ......................................... 123/298; 123/305
[58] Field of Search ........................... 123/90.27, 90.31, 123/298, 305, 295, 307, 308, 309, 301, 302, 274, 276

[56] References Cited

U.S. PATENT DOCUMENTS

| | | | |
|---|---|---|---|
| 4,125,094 | 11/1978 | Noguchi et al. | 123/32 |
| 5,127,378 | 7/1992 | Ito | 123/300 |
| 5,327,864 | 7/1994 | Reguiero | 123/260 |
| 5,347,964 | 9/1994 | Reguiero | 123/90.22 |
| 5,529,038 | 6/1996 | Tsuchida | 123/305 |
| 5,836,284 | 11/1998 | Oda et al. | 123/308 |

FOREIGN PATENT DOCUMENTS

| | | |
|---|---|---|
| 0558072 A1 | 9/1993 | European Pat. Off. . |
| 4140962 A1 | 1/1993 | Germany . |
| 5-106452 | 4/1993 | Japan . |
| 6-81651 | 3/1994 | Japan . |
| 08165975A | 6/1996 | Japan . |

OTHER PUBLICATIONS

"Patent abstracts of Japan", vol. 095, No. 006, abstract of JP-07-063142, Jul. 1995.
"Patent abstracts of Japan", vol. 017, No. 252(M-1412), abstract of JP-04-370319, May 1993.

*Primary Examiner*—Willis R. Wolfe
*Assistant Examiner*—Mahmoud M Gimie
*Attorney, Agent, or Firm*—Sidley & Austin; Hugh A. Abrams

[57] ABSTRACT

A direct injection engine provided with an injector at a peripheral portion of a combustion chamber to inject at least at a latter stage of a compression stroke in at least in a low engine load and low engine speed condition, wherein a distance from the tip end of the injector to an opposite end the combustion chamber is determined greater than a traveling distance of an injected fuel for a time period from a start of a fuel injection at the latter stage of the compression stroke to the ignition timing, wherein; an ignition plug is arranged that an ignition gap is disposed within an injection area of the injector; and, wherein a distance from the tip end of the injector to the ignition gap is determined smaller than said traveling distance of the injected fuel. An ignitability and combustion stability can be improved to thereby improve a fuel consumption efficiency.

25 Claims, 15 Drawing Sheets

DIRECT FUEL INJECTION ENGINE

BACKGROUND OF THE INVENTION

1. Field of the Invention

The present invention relates to a fuel injection system of an engine, in particular, to a direct fuel injection engine in which a fuel injector is so arranged that a nozzle of the injector is directed into a combustion chamber to inject a fuel at a later stage of a compression stroke in at least a low load and low engine speed condition of the engine.

2. Related Art

As disclosed in Japanese unexamined patent publication No. 6-81651 published in 1994, a direct injection engine has been known that is provided an ignition plug, injector for directly injecting a fuel into a combustion chamber to facilitate a laminar combustion so as to improve a fuel consumption efficiency at a later stage of a compression stroke in at least the low load and low engine speed condition of the engine. In this type of engine, the fuel is injected into the chamber while suppressing a diffusion of the fuel so as to facilitate the lamination of the intake gas in the chamber. In this case, it is necessary to suppress the diffusion of the fuel but facilitate an atomization of the fuel and locate a combustible intake gas mixture of an appropriate air fuel ratio around the ignition plug.

For this purpose, the direct injection engine disclosed in the above Japanese publication, a piston is formed with a recessed and curved surface on its top surface and a raised portion continued from the curved surface. The injection is arranged so as to inject the fuel toward the recessed and curved surface when the piston attains to substantially a top dead center. The ignition plug is arranged against the raised portion so that the fuel injected from the injector hits the curved surface of the piston to diffuse to be mixed with the air and stay around the ignition plug.

Japanese Un-examined Patent publication No. 8-165975 also discloses a direct fuel injection engine structure in which a recess or cavity is provided on the top surface of the piston wherein the injected fuel passes through the ignition gap.

As aforementioned, in such conventional direct injection engine, the fuel from the injector is directed to hit a wall of the combustion chamber (for example, the top surface of the piston). In this way, a part of the fuel hit the wall stick to a surface of the wall and is left thereon without diffusion. This fuel tends to be emitted without a complete combustion. As a result, a hydrocarbon mixture in an exhaust gas is increased to deteriorate not only an emission performance but also the fuel consumption efficiency.

SUMMARY OF THE PRESENT INVENTION

The object of the invention is therefore to provide a direct fuel injection engine which can improve ignitability, combustion stability and thus, the fuel consumption efficiency.

The above object of the present invention can be accomplished by a direct injection engine provided with an injector at a peripheral portion of a combustion chamber to inject at least at a latter stage of a compression stroke in at least a low engine load and low engine speed condition, wherein; a distance from the tip end of the injector to an opposite end of the combustion chamber is determined greater than a traveling distance of an injected fuel for a time period from a start of a fuel injection at the latter stage of the compression stroke to the ignition timing, wherein; an ignition plug is arranged that an ignition gap is disposed within an injection area of the injector; and, wherein a distance from the tip end of the injector to the ignition gap is determined smaller than said traveling distance of the injected fuel.

In a preferred embodiment, a direct injection engine including a piston disposed in a cylinder bore of a cylinder block, a ceiling portion defining an upper portion of the combustion chamber formed in a cylinder head to be extended upwardly in a cylinder head from a joint surface of the cylinder head with the cylinder block, a slant surface formed in the ceiling portion extending downwardly in an exhaust port side of the combustion chamber, a parallel surface formed in the ceiling portion extending in substantially parallel with said joint surface in an intake port side to form a trapezoid like configuration of the combustion chamber in section by the ceiling portion and a top surface of the piston, and, the injector being arranged to inject obliquely downwardly.

Preferably, a recess is formed on the top surface of the piston. The recess extends and gets deep and wide along an injecting direction. The recess is greater than a size of the injected fuel with regard to a direction perpendicular to the injecting direction of the injector.

The distance from the tip end of the injector to an opposite wall of the combustion chamber in the injecting direction is greater than said traveling distance of the injected fuel for the time period between the injection start in the latter stage of the compression stroke and the ignition timing.

A raised portion may be provided to be extended upwardly and formed on the top surface of the piston closer to an intake port than the recess. In this case, preferably, a shelf portion is formed on the top surface of the piston between the raised portion and the recess. In a preferred embodiment, an injection angle of the injector is not greater than approximately 30 degrees when the injection is made at the latter stage of the compression stroke. The injection angle of the injector is not greater than approximately 30 degrees when the injection is made in an low engine load and low engine speed at the latter stage of the compression stroke. The injection angle is increased in a high engine load and high engine speed.

Further, the injection angle of the injector may be reduced as an atmospheric pressure is increased, and an injection timing of the injector is determined in accordance with an engine operating condition so that the injection is made at the latter stage of the compression stroke in the low engine load and low engine speed and is made at an intake stroke in the high engine load and high engine speed.

The injection, preferably, is executed at an early stage and latter stage of the compression stroke in a middle engine load condition. In a preferred embodiment, a gas flow control means is provided for enhancing a gas flow in the combustion chamber when the injection is made in the compression stroke.

The gas flow control means includes a swirl producing means for producing a swirl of an air fuel mixture when the injection is made at the latter stage of the compression stroke so that a swirl ratio in the low engine load condition is greater than that in the low engine load condition. Typically, the gas flow control means includes a first intake port for producing the swirl, a second intake port for producing a tumble and a swirl control valve for opening and closing the second intake port.

An opening of the swirl control valve is increased to reduce the swirl ratio and is decreased to increase the swirl ratio.

In another aspect of the present invention, a direct injection engine includes a combustion chamber defined by a top surface of a piston disposed in a cylinder bore formed by a cylinder block and a lower surface of a cylinder head, an intake port and exhaust port formed in the cylinder head to be opened to the combustion chamber, an intake and exhaust valves for opening and closing the intake and exhaust ports, an injector mounted on the cylinder head for directly injecting a fuel into the combustion chamber, an ignition plug mounted on the cylinder head. The intake and exhaust valves are arranged in a manner that an inclination of an axis of the intake valve being smaller than that of the exhaust valve with regard to an axis of the cylinder bore.

Wall surfaces of the combustion chamber in an intake port side and exhaust port side are perpendicular to the axes of the intake and exhaust valves respectively. The injector is disposed in a lower portion of the cylinder head in the intake port side. The intake port is provided between the injector and the axis of the intake valve to be extended obliquely upwardly from the combustion chamber to a side portion of the cylinder head.

In this case, the intake port includes a first intake port for producing a swirl of an intake gas and a second intake port for producing a, tumble of the intake gas. Angles of the first and second intake ports to the combustion chamber are substantially the same at the openings. The second port is extended more uprightly than the first port in an upstream portion. A gate valve is provided in the second port in an upstream position.

The engine further includes a valve driving mechanism of DOHC in which an intake and exhaust cam shafts are extended in parallel with each other. The exhaust cam shaft is disposed lower than the intake cam shaft with regard to the axis of the cylinder bore.

The exhaust cam shaft is driven by a crank shaft through a transfer means. The intake cam shaft is driven by the exhaust cam shaft through a transmitting means which, preferably includes a pair of gears. In another aspect, the engine may be so arranged that the cam shafts are extended transversely in a vehicle and, the intake cam shaft is located at a rear side compared with the exhaust cam shaft in a longitudinal direction of the vehicle.

Preferably, a first and second intake ports being extended and opened to the ceiling portion of the combustion chamber side by side, and a first and second exhaust ports being extended and opened to the ceiling portion of the combustion chamber side by side.

The intake and exhaust valves are arranged in a manner that an inclination of an axis of the intake valves being smaller than that of the exhaust valves with regard to an axis of the cylinder bore. Wall surfaces of the combustion chamber in an intake port side and exhaust port side are perpendicular to the axes of the intake and exhaust valves respectively. A configuration of the combustion chamber can be of a substantially trapezoid in section. The injector is disposed in a lower portion of the cylinder head in the intake port side. The first intake port is directed to a circumferential direction of the combustion chamber. A vertical wall portion of the combustion chamber between the first intake port and the first exhaust port adjacent to the first intake port is arcuate in conformity of a wall surface of the cylinder bore. Further, vertical wall portions of the combustion chamber between the first and second intake ports and between the second intake port and second exhaust port adjacent to the second intake port are extended inwardly from an outer common tangential line of valve rims adjacent to each other in a plan view. The vertical wall portions between the first and second exhaust ports may be extended so as to accord to the outer common tangential line of the valve rims of the exhaust valves.

Alternatively, the vertical wall portions between the first and second exhaust ports is arcuate in conformity with the wall surface of the cylinder bore.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Figure 1:
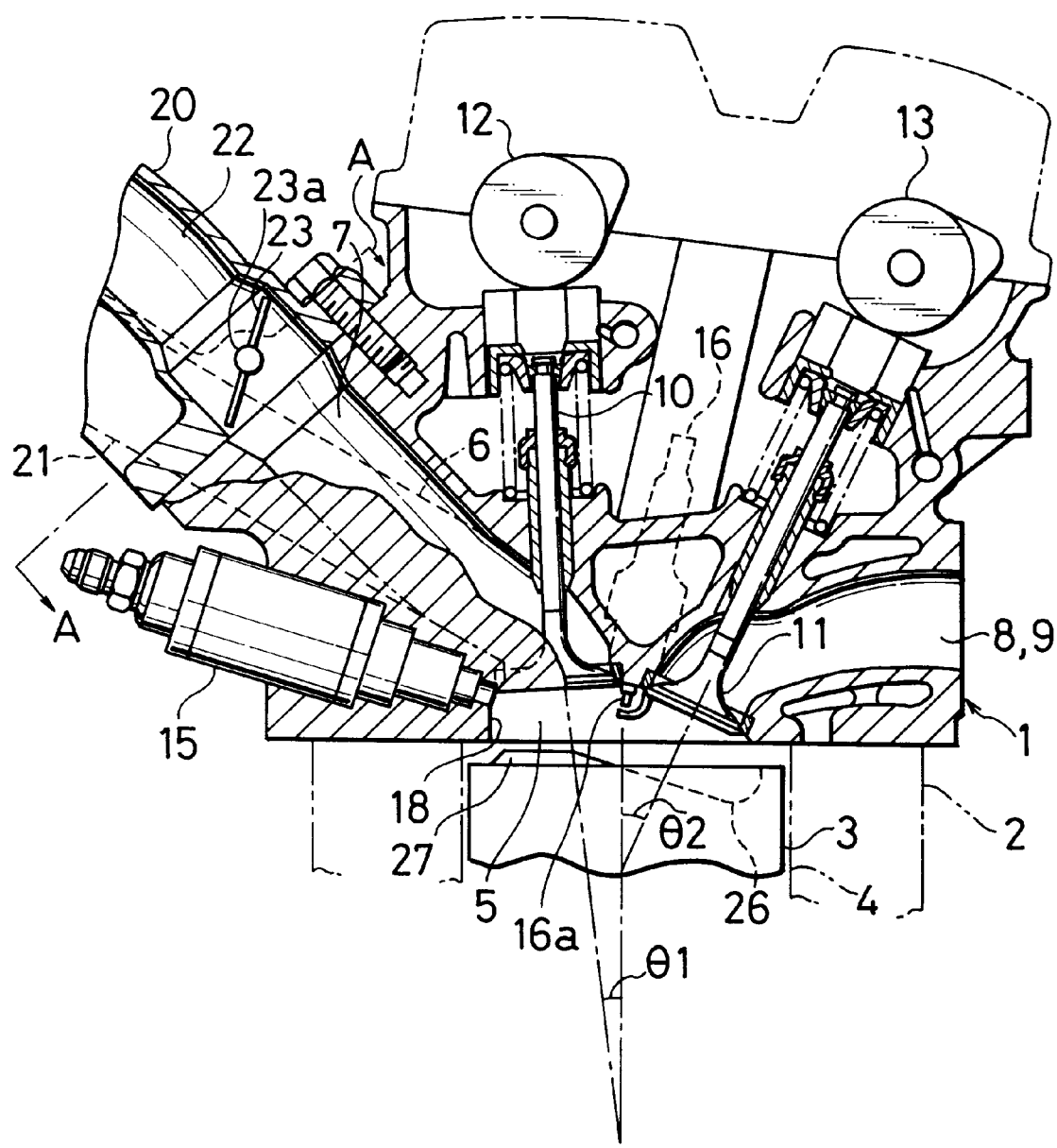
FIG. 1 is a sectional view of a direct injection engine according to the present invention.
Figure 2:
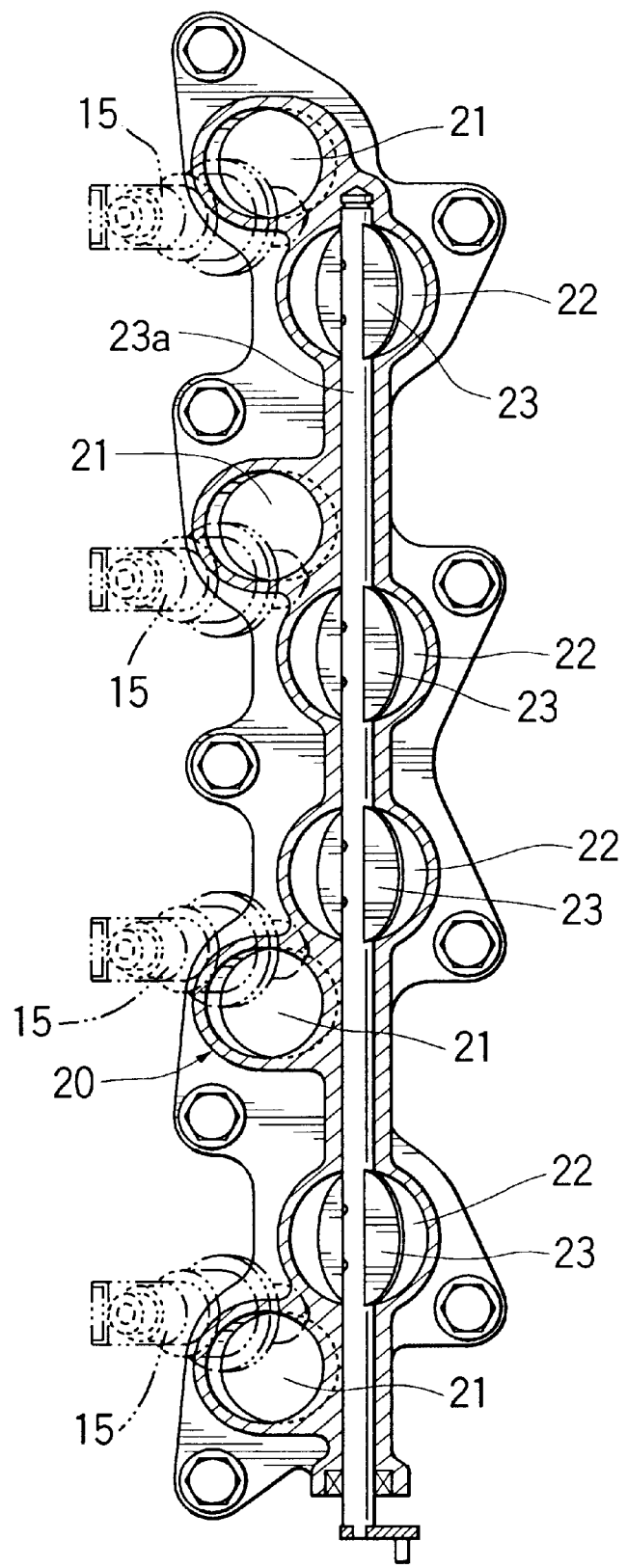
FIG. 2 is a sectional view taken along a line A—A in FIG. 1.
Figure 3:
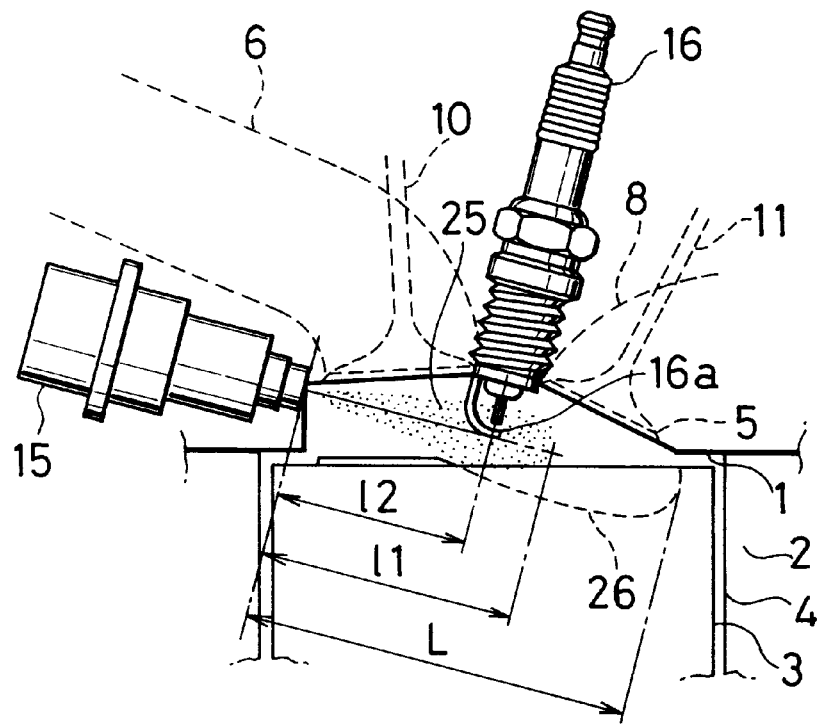
FIG. 3 a schematic sectional view around the combustion chamber.
Figure 4:
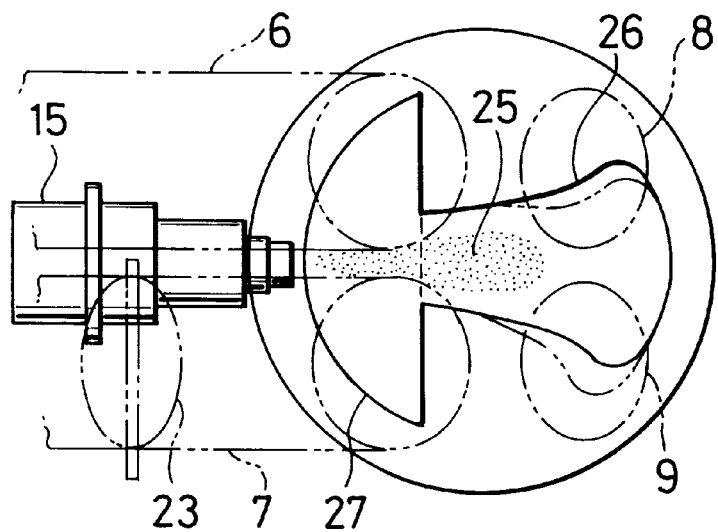
FIG. 4 is a schematic plan view of the combustion chamber and thereabout.

Hereinafter, the present invention is described in detail taking reference with the attached drawings. FIG. 1 is a sectional view of a direct injection engine in accordance with a preferred embodiment of the present invention. FIG. 2 is a sectional view along a line A—A in FIG. 1. FIG. 3 is a schematic sectional view. FIG. 4 is a schematic plan view. In the drawings, numeral 1 designates cylinder head arranged on a cylinder block 2, numeral 3 is a piston which is disposed in a cylinder bore 4. A combustion chamber 5 is defined between a top surface of the piston 3 and a lower surface of the cylinder head 1. The lower surface of the cylinder head is formed with a recess configuration or dome ceiling. The cylinder head 1 is formed with an intake port and exhaust port open to the combustion chamber 5. In the illustrated embodiment, a pair of intake ports 6 and 7 and a pair of exhaust ports 8, 9 are provided. The intake ports 6 and 7 are combined with intake valves 10 respectively and the exhaust ports 8 and 9 are combined with exhaust valves 11 respectively. The intake and exhaust valves 10 and 11 are driven by cams of intake valve camshaft 12 and exhaust valve cam shaft 13.

In addition, a fuel injector 15 for directly injecting a fuel into the combustion chamber 5 and an ignition plug 16 are mounted on the cylinder head 1. A tip end portion or nozzle portion of the injector is arranged at a peripheral portion of the combustion chamber. A tip end of the ignition plug 16 is located substantially at a center of the ceiling of the combustion chamber 5.

Axes of the valves 10 and 11 are inclined from an axis of the cylinder bore by angles θ1 and θ2 respectively. The intake valve 10 and exhaust valve 11 are so arranged that the angles θ1 of the intake valve 10 is smaller than the angle θ2 of the exhaust valve 11. The wall surfaces of the chamber 5 at the intake opening and the exhaust opening are perpendicular to the axes of the valves 10 and 11. The valve axis of the exhaust valve 11 is inclined from the axis of the cylinder bore with a relatively large angle but the angle of the intake valve 10 is inclined from the axis with a relatively small angle.

Figure 6:
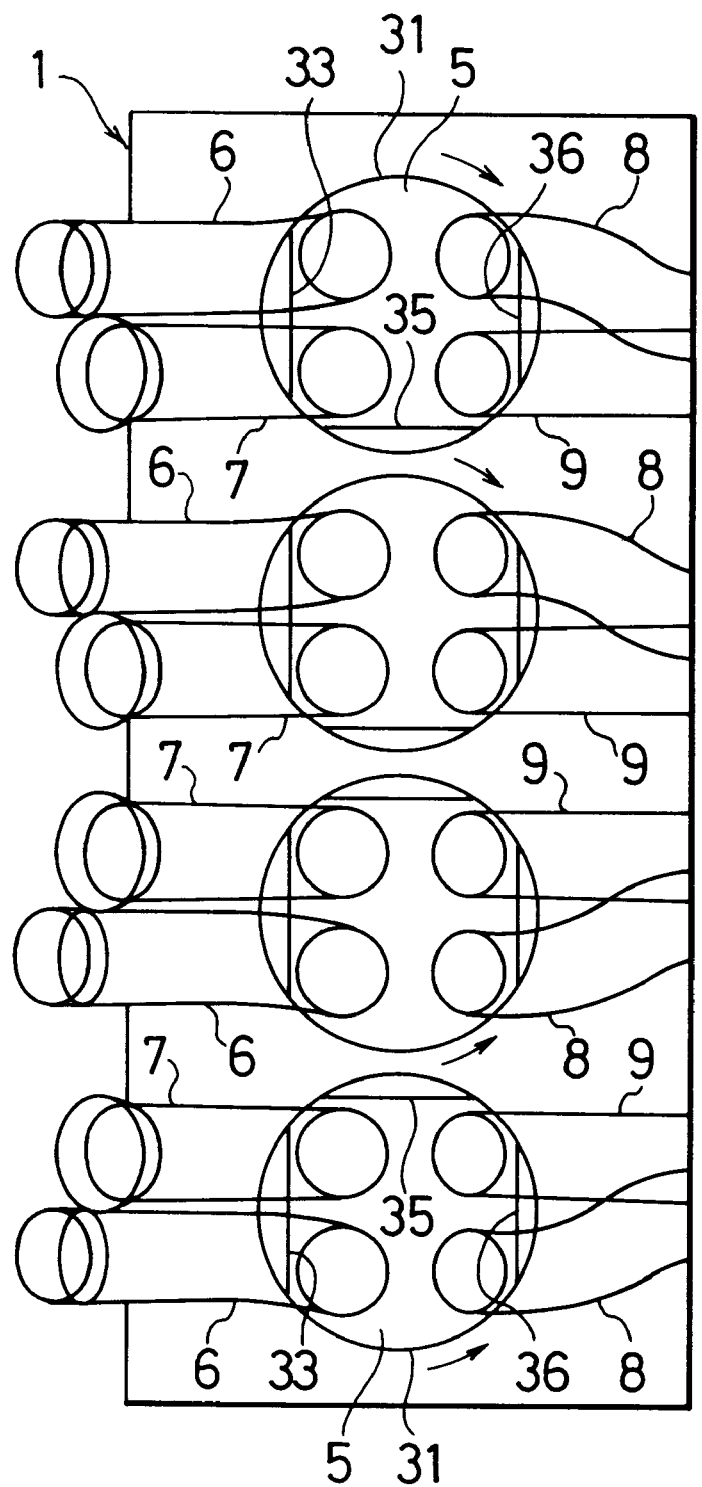
FIG. 6 is a schematic plan view showing an arrangement of the combustion chamber, intake and exhaust ports.

Specifically, as shown in FIG. 6, both intake ports 6 and 7 are disposed side by side in an axial direction of the cam shaft and open to the chamber 5 at one side of the dome ceiling or lower surface of the cylinder head 1 and the exhaust ports 8 and 9 are disposed side by side in the axial direction of the cam shaft and open to the chamber 5 at the other side of the lower surface of the cylinder head 1.

The dome ceiling of the chamber 5 is of a slant surface extending from the center toward a lower end of the cylinder head or a joint between the cylinder head and cylinder block 2 with a predetermined angle in the exhaust port side while extending substantially horizontally or along a joint surface of the cylinder head and cylinder block in the intake port side. There is provided a substantial vertical wall portion 18 in the intake port side. Thus, the ceiling is of a trapezoid configuration in a section view as shown in FIGS. 1 and 3 which is taken along a plane perpendicular to the axial direction of the cam shafts 12 and 13. The first intake port 6 is provided for producing a swirl of the intake gas while the second port 7 is provided for producing a tumble of the intake gas. Both the intake ports 6 and 7 are extended upwardly in an upstream direction. The second intake port 7 is inclined vertically greater than the first intake port 6 as shown in FIG. 3. To the intake ports 6 and 7 are connected an intake manifold 20 which is formed with intake passages 21 and 22 corresponding to the ports 6 and 7 respectively. A swirl control valve 23 is disposed in the second intake port 7 or intake passage 22 for opening and closing the intake port 7. When the swirl control valve 23 is closed, a swirl or horizontal vortex of the intake gas from the intake port 6 is produced. The swirl control valve is provided for each of the cylinders and connected with a common shaft 23a through which an actuator drives the swirl control valves. As the opening of the control valve 23 is increased, the swirl is weakened and a tumble or vertical vortex is produced by the intake gas from the intake port 7.

The both intake ports 6 and 7 are extended upwardly in an upstream direction between the injector 15 and the valve axes of the intake valves. To the intake ports 6 and 7 are connected an intake manifold 20 with intake passages 21 and 22.

Figure 5:
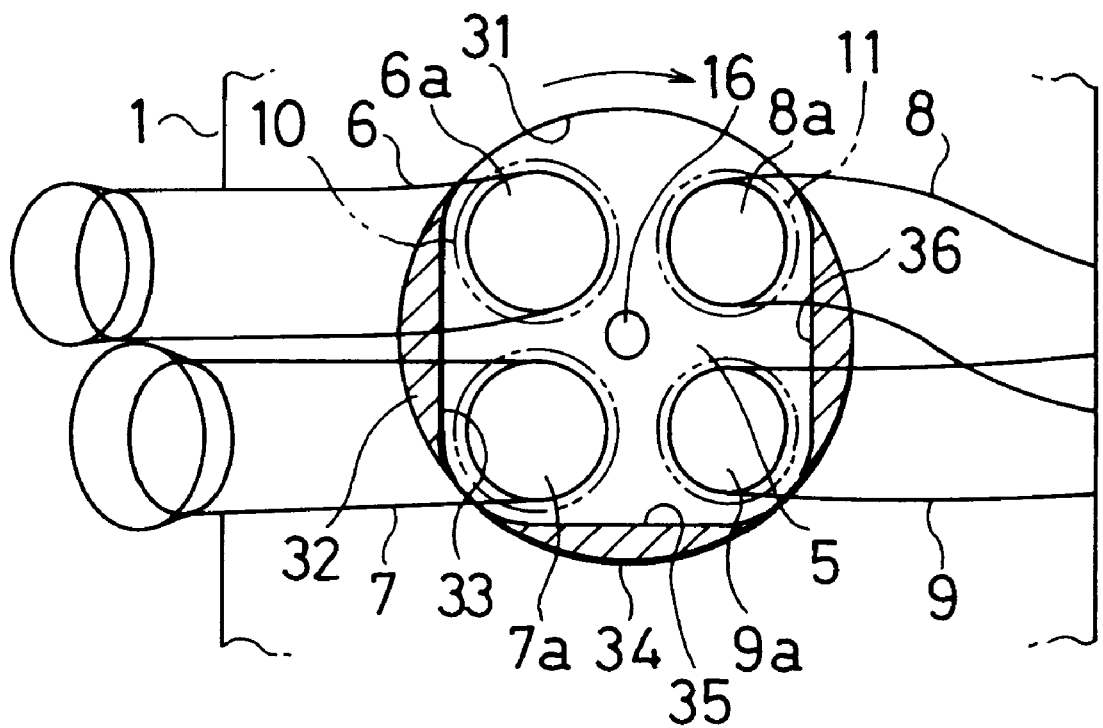
FIG. 5 a schematic view showing a configuration of the combustion chamber.

As shown in FIGS. 5 and 6, a peripheral vertical wall 31 of the cylinder head 1 which defines an upper portion of the combustion chamber 5 is of a circular configuration in conformity with a peripheral and circular wall of the cylinder bore. Between the opening 6a of the first intake port 6 and the opening 7a of the second intake port 7 and between the opening 7a of the second intake port 7 and the opening 9a of the second exhaust port 9 on the vertical wall 31 are formed masks 32 and 34 extended inwardly from the vertical circumferential wall.

In the plan view as shown in FIG. 5, the vertical walls 33 and 35 of the masks 32, 34 are accorded with tangential lines of outlines of rims of the valves adjacent to each other.

In the illustrated embodiment, another vertical wall 36 is formed between an opening 8a of the first exhaust port 8 and the opening 9a of the second exhaust port 9. In the plan view, the wall 36 is accorded with a tangential line of rims of the first and second exhaust valves.

In this arrangement, as aforementioned, the downward slant surface is formed toward the exhaust port side in the chamber 5. Therefore, the vertical wall 36 is lower than the walls 33 and 35.

The injector 15 is mounted on the cylinder head 1 lower than the intake ports 6 and 7 of the one side of the combustion chamber 5. The tip end of the injector 15 is projected into the chamber 5 from the vertical wall portion 18.

Figure 7:
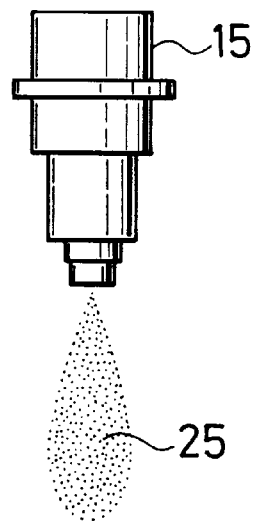
FIG. 7 is an explanation view showing an expansion of a fuel injection when an fuel injection is made from a high pressure injector at a latter stage of a compression stroke.
Figure 8:
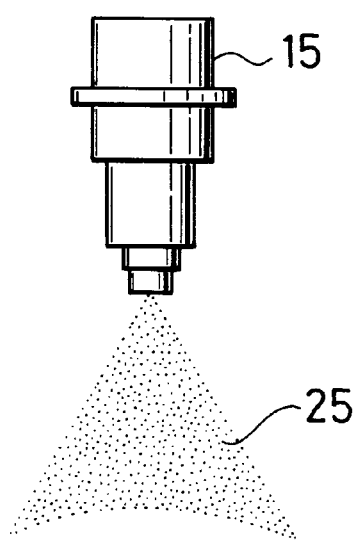
FIG. 8 is an explanation view showing an expansion of a fuel injection when an fuel injection is made from a high pressure injector at an intake stroke.

The injector 15 is of a narrow angle injector of which injection angle is not greater than 30 degree when in at least a latter stage of the compression stroke. In this embodiment, a high pressure injector with an injection nozzle configuration adapted to produce an injection swirl is employed. The injection angle of such high pressure injector tends to be narrower. Thus, when the fuel injection is executed at the latter stage of the compression stroke in which the pressure in the chamber is increased, the injection angle is reduced below 30 degree (as shown in FIG. 7). When the injection is made in the intake stroke in which the chamber pressure is low compared with the latter stage of the compression stroke, the injection angle becomes wider (as shown in FIG. 8). Numeral 25 denotes an atomized fuel configuration from the injector 15.

As shown in FIG. 1 and 3, the injection is directed downwardly obliquely. As shown in FIG. 1 through 3, the top surface of the piston 3 is basically of a flat configuration and formed with a recess 26 extending along a center axis of the injector 15 toward the side of the exhaust port side in the cylinder bore.

The recess becomes deeper forwardly in an injecting direction. The size of the recess is greater than that of the injection with regard to a direction perpendicular to the injecting direction. In other words, the injector 15 is oriented downwardly obliquely from the joint surface of the cylinder block and cylinder head. In other words, the recess is increased in size along a forward direction of injection to cover a distension of the atomized fuel 25 from the injector 15. The recess 26 is effected to reduce the compression ratio of the piston 3. In view of this, a raised portion 27 is formed on the top surface of the piston 3 in the intake side thereof. The distance from the tip end of the injector 15 to a chamber wall in the injecting direction is greater than a traveling distance of the atomized fuel for a time period between an injection start in the latter stage of the compression stroke and an ignition timing. The ignition plug 16 is so arranged that an ignition gap thereof is included in the injection area of the fuel. The distance from the tip end of the injector 15 to the ignition gap 16a is smaller than the traveling distance of the fuel.

Specifically, When the piston 3 is in the vicinity of the top dead center at the latter stage of the compression stroke, as shown in FIG. 3, a terminal end of the recess 26 in the injecting direction defines an opposite end of the chamber 5 to the injector 15. A distance from the tip end of the injector 15 to the terminal end of the recess 26 or virtually terminal end of the chamber 5 is referred to as L. The traveling distance of the injected fuel for the time period from the start of the injection at the latter stage of the compression stroke in at least low engine load and low engine speed condition to the ignition timing is referred to as 11. The distance from the tip end of the injector 15 to the ignition gap 16a of the plug 16 is referred to as 12. Relationships of arrangement between the injector 15, ignition plug 16, recess 26 and the like and relationships between these factors and starting of the injection and the ignition timing are determined to be L>11>12.

Figure 9:
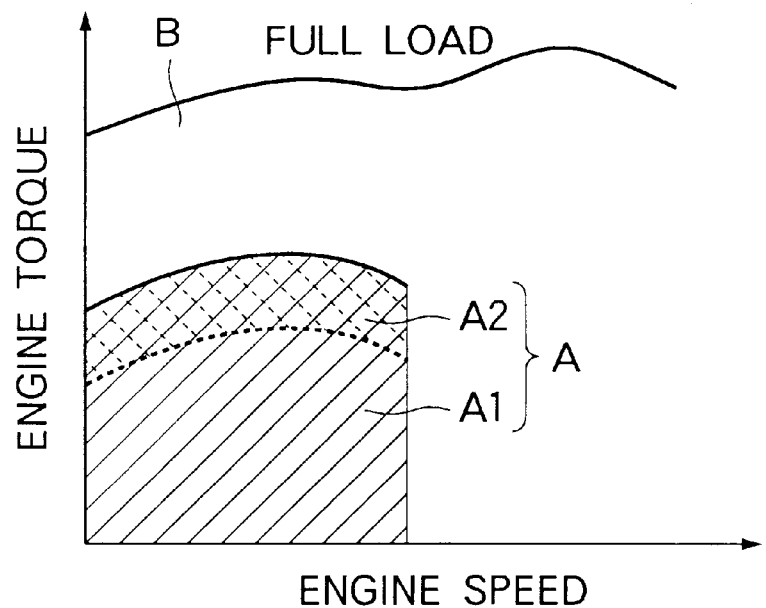
FIG. 9 is an explanation view showing an operation areas of the fuel injection in the compression stroke and the intake stroke.

As shown in FIG. 9, the fuel injection timing of the injector 15 is controlled in accordance with an operating condition. In FIG. 9, a hatched area A shows an injection area of the operating condition in which the fuel injection is executed in the latter stage of the compression stroke. An area B shows another injection area in which the fuel injection is executed at the intake stroke. As shown in FIG. 9 by the area A, when the engine load is not greater than a predetermined value of middle or small load and when the engine speed is not greater than a predetermined value of middle or low speed, the fuel injection is executed at the latter stage of the compression stroke. In the area A, an area A1 shows a lower engine load area in which the fuel injection amount is relatively small. For this purpose, the fuel injection is made once in this area. On the other hand, in an area A2 of middle engine load in which the fuel injection amount is greater than the area A, the fuel injection is made twice. Where the engine operating condition is in an area that the engine load is greater than a predetermined value, or the engine speed is greater than a predetermined value, the fuel injection is made in the intake stroke.

Figure 10:
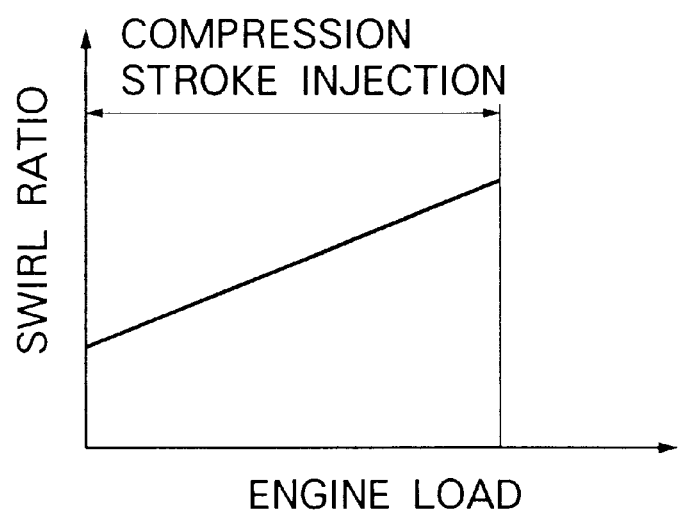
FIG. 10 is a view showing a swirl control property in accordance with an engine load.
Figure 11:
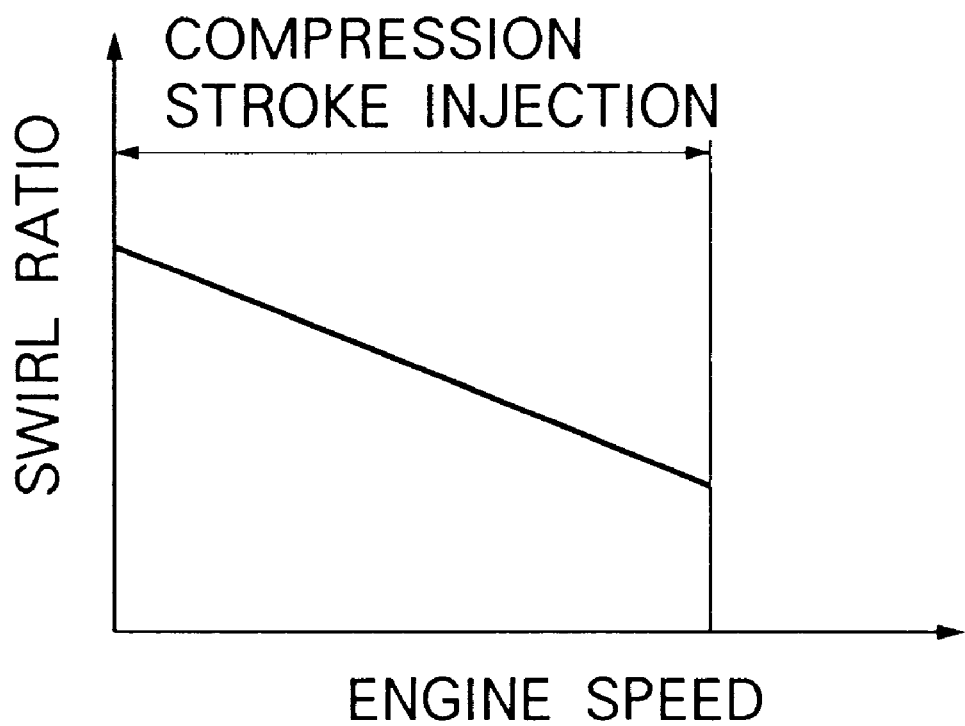
FIG. 11 is a view showing a swirl control property in accordance with an engine speed.

When the fuel injection is made during the compression stroke, a swirl control is executed as shown in FIGS. 10 and 11. The opening of the swirl control valve is increased as the engine load is reduced so as to reduce a swirl ratio. On the other hand, the swirl ratio is increased in the higher engine load in which the fuel injection is executed at the compression stroke since the opening of the swirl control valve 23 is reduced as the engine load is increased.

As shown FIG. 11, the opening of the swirl control valve is increased as the engine speed is reduced so as to increase a swirl ratio. On the other hand, the swirl ratio is decreased in the condition in which the fuel injection is executed at the compression stroke since the opening of the swirl control valve 23 is increased as the engine speed is increased.

A throttle valve is also controlled in accordance with the operating condition. Normally, the throttle valve is fully open in all the operating conditions since a desirable combustibility can be maintained by forming the laminar condition of a fuel and intake air mixture even in a leaner condition in a low engine speed operation in which an intake air is much more than the fuel amount. The throttle valve is closed in a limited condition such as cranking, low exhaust gas temperature condition in a warming up operation and the like in order to facilitate the warming up of a catalyst for cleaning the exhaust gas.

Figure 12:
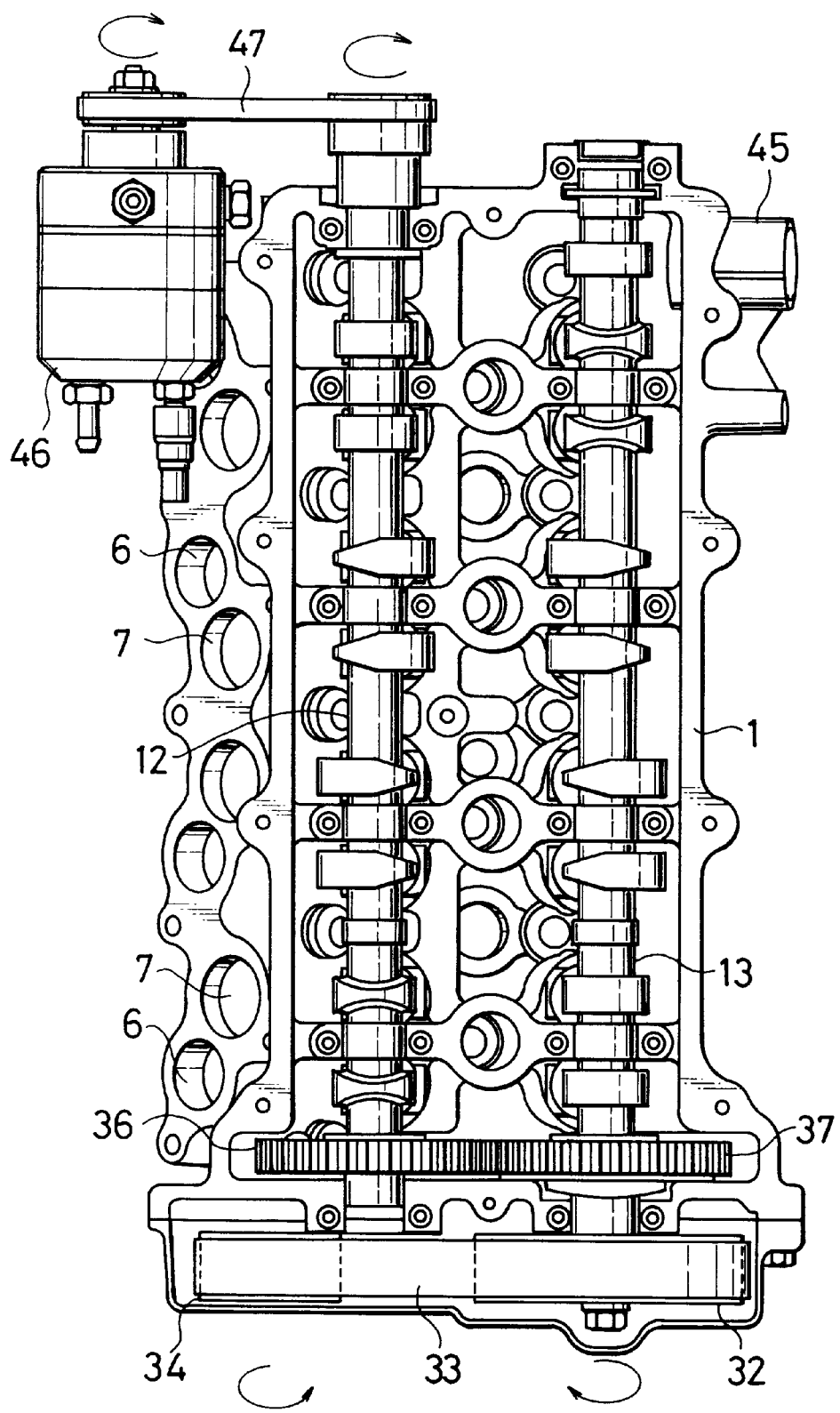
FIG. 12 is an entire plan view of the cylinder head.
Figure 13:
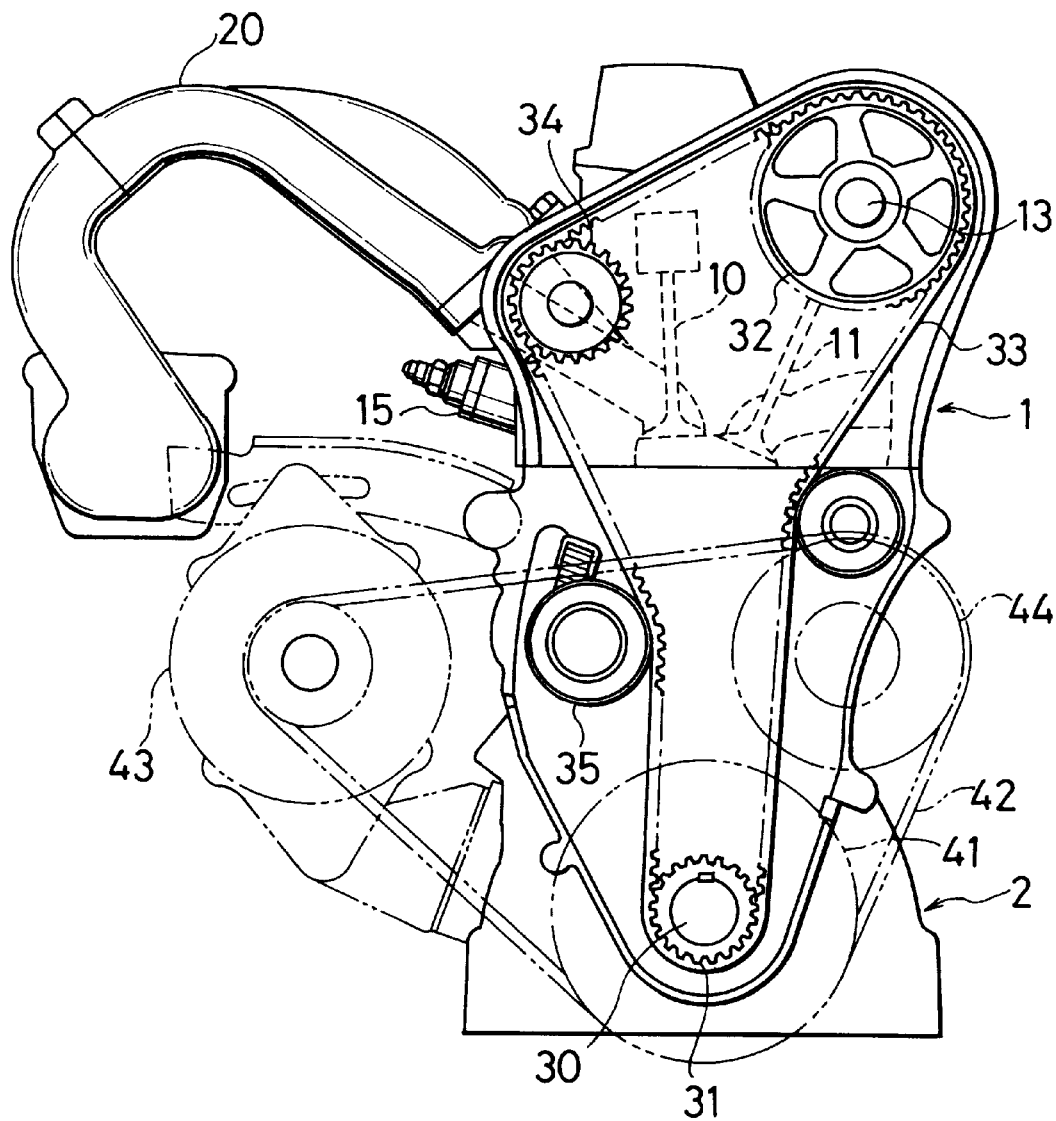
FIG. 13 is a schematic front view showing an engine valve driving mechanism.

As shown in FIG. 12 and 13, valve driving mechanism is of a double over head cam shaft (DOHC) in which intake and exhaust cam shafts 12 and 13 are disposed in parallel with each other over the cylinder head. The lengths of the both valve stems are the same. But, the inclination of the exhaust valve stem is greater than the intake valve stem. The exhaust cam shaft 13 is positioned lower than the intake cam shaft 12 as a result of the arrangement of the intake valve 10 and exhaust valve 11.

The exhaust cam shaft 13 is driven by a crank shaft 30 through a transfer means and the intake cam shaft 12 is driven by the exhaust cam shaft 13 through a connecting means.

The transfer means is provided with a crank pulley 31 at a front end portion of the crank shaft 30, cam pulley 32 at a front end of the exhaust cam shaft 13, a timing belt circulating these elements, idler 34, tensioner 35 and the like. Through the transfer means, the rotation force of the crank shaft 30 is transmitted to the exhaust cam shaft 13. In this case, the cam pulley 32 has a diameter as twice as the crank pulley 31 so that the cam shaft 13 rotates at the half speed of the crank shaft 30. There are gears 36 and 37 with the same diameters at the front end portions of the shafts 12 and 13 to be meshed with each other so that the shafts 12 and 13 rotates in the opposite direction to each other.

A drive pulley 41 in addition to the pulley 31 is provided to drive alternator 43, water pump 44 and the like through a belt 42. A distributer mount 45 is disposed at one side of a rear end of the exhaust cam shaft 13. A distributer (not shown) mounted on the mount 45 are adapted to be driven by the cam shaft 13. On the other hand, a fuel pump 46 is disposed at one side of a rear end of the intake cam shaft 12 to be driven by the cam shaft 12 through a belt 47.

The injector 15 is disposed in the vicinity of the intake ports in order to avoid a thermal influence from the exhaust side of the chamber 5. In this case, the inclination of the axis of the intake valve 10 is smaller than that of the exhaust valve 11. The intake port side portion of the upper surface of the chamber 5 extends substantially horizontally. The chamber 5 is of a trapezoid in section along with the axial direction of the cylinder bore. The intake port side of the chamber 5 is formed with a vertical wall portion 18 to be terminated in the lower end of the cylinder head. The injector 15 is mounted through the vertical wall surface 18 so that the tip end of the injector 15 is projected into the chamber 5. This arrangement enable the injector to be properly disposed with enough space.

The first and second intake ports 6 and 7 are provided in a space between the injector 15 and the valve stem of the intake valve 12. As aforementioned, the inclination of the valve stem of the intake valve from the axial line of the cylinder bore is small compared with the exhaust valve. Thus, the space between the valve stem of the intake valve 10 and the injector is relatively expanded. As a result, the intake ports 6 and 7 can be constituted to be streamlined and thus, reduce a pressure loss of the intake gas. The intake ports 6 and 7 are spaced from each other so that the intake port 6 does not interfere with the arrangement of the swirl control valves 23 and the control shaft 23a therefor, which are provided for the intake port 7. In addition, the intake ports 6 and 7 are extended substantially horizontally to be connected to the intake manifold 20 at a side of the cylinder head 1. Therefore, this arrangement enable the height of the front body to be lowered as compared with one disclosed in the Japanese Unexamined patent publication in which the intake port is connected with the intake manifold above the cylinder head.

In another aspect of the illustrated embodiment, the intake and exhaust cam shaft 12 and 13 are disposed over the cylinder head 1. One of the shaft is driven by the crank shaft 30 through a transfer means and both the shafts 12 and 13 are connected with each other so that the other is driven by the one of the shaft. Since the exhaust cam shaft is driven by the crank shaft 30, the height of the engine can be reduced as a whole.

As aforementioned, the exhaust cam shaft 13 is disposed lower than the intake cam shaft 12. The cam pulley 32 is twice as large as the pulley on the crank shaft 30. According to the illustrated embodiment, such large pulley 32 is only provided on the exhaust cam shaft 13 rather than the intake cam shaft 12 which is disposed at a higher position than the shaft 12. Thus, the engine height can be suppressed.

Figure 14:
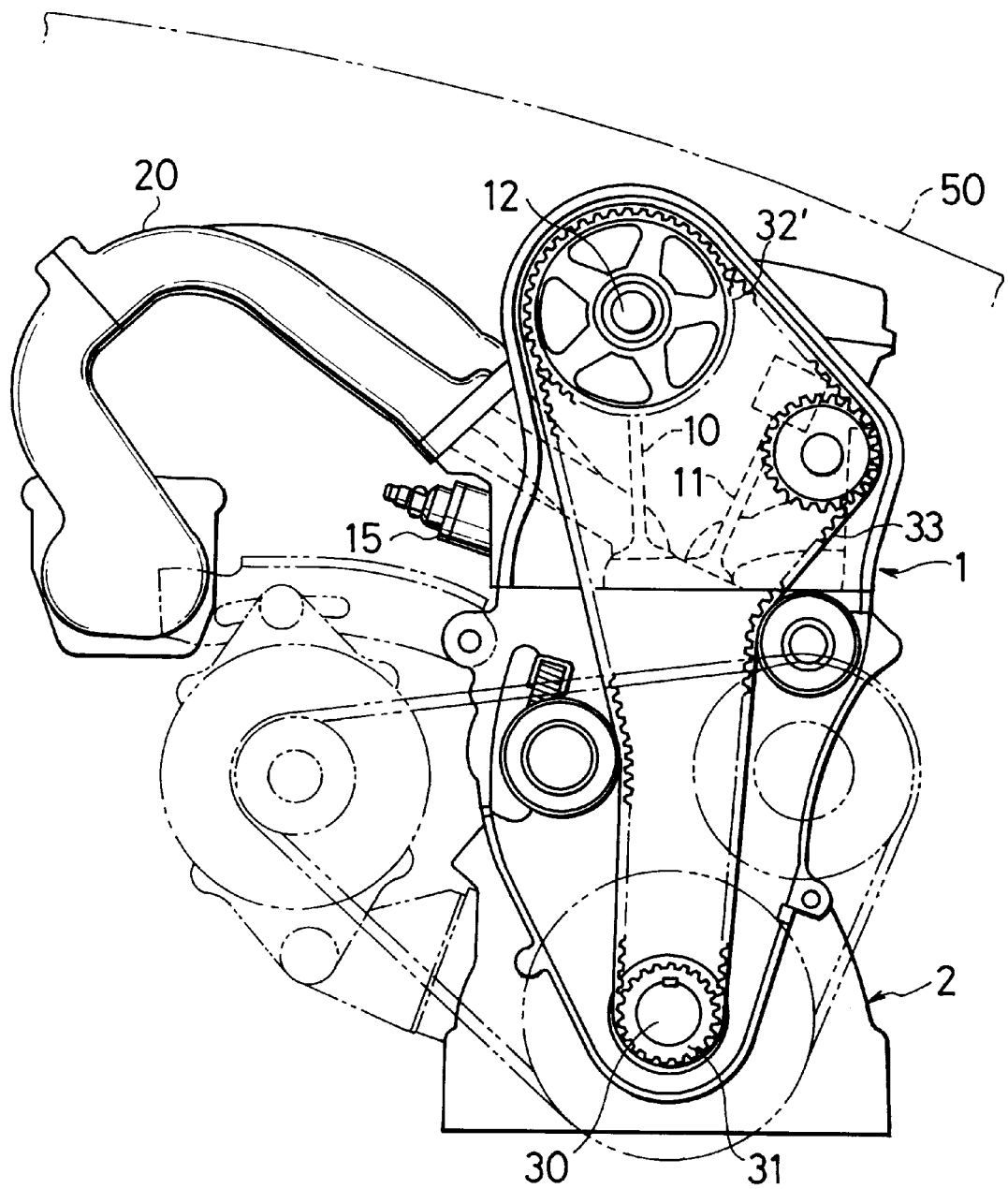
FIG. 14 is a schematic front view of another engine valve driving mechanism.

In reference to FIG. 14, there is shown another embodiment of the present invention. In this arrangement, the intake cam shaft 12 is driven by the crank shaft 30 through a transfer means unlike the arrangement of FIG. 13. The pulley 32 is provided on the intake cam shaft 12 to be connected to the crank pulley 31 through the timing belt. This engine is of a transverse engine in which the cam shafts extend transversely in an engine room under a bonnet 50. With this embodiment, although the engine height is increased compared with the former embodiment, the engine is disposed transversely with the intake side being disposed rear side. In this case, the exhaust side with a lower height than the intake side is disposed at a front side in the engine room. Therefore, where the bonnet is slanted downwardly toward the front side, this engine can be properly arranged in the engine room along the slant body line. On the other hand, the arrangement of the former embodiment is suitable to a vehicle in which the engine is disposed longitudinally or the bonnet line is relatively flat.

Various modification can be made based on the above embodiment, For example, a chain can be employed in lieu of the gears 36 and 37 although the distance between the shafts 12 and 13 will get long. The timing belt could be a chain.

In operation, in a low engine load and low engine speed condition, the fuel is injected from the injector 15 into the combustion chamber 5 for making a laminar combustion of the air and fuel mixture. As aforementioned, the distance L from the tip end of the injector 15 to the opposite side of the chamber 5 is provided to be greater than the traveling distance 11 of the atomized fuel during the time period from the start of the injection to the ignition timing. As a result, it can be avoided that the atomized air reaches and adheres to the wall of the combustion chamber 5 or the terminal end of the recess 26 opposite to the injector 15. In addition, the ignition gap 16a of the tip end of the ignition plug 16 is disposed in the area where the injected and atomized air passes through. In other words, the gap 16a is positioned to interfere with the path of the injected fuel. The traveling distance 11 is greater than the distance 12 from the tip end of the injector 15 to the ignition gap 16a so that the atomized air stays around the ignition gap 16a at the ignition timing. As a result, the ignition stability can be obtained so that the fuel combustion is effectively performed in a laminar condition of the air and fuel mixture. In addition, an emission of hydrocarbon compounds can be reduced since the injected fuel can be effectively kept from adhering to the wall surface of the chamber 5. Thus, the emission performance and fuel consumption can be improved.

These advantageous features result from the above unique arrangement of the injector 15 and configuration of the chamber 5, piston 3, ignition plug 16 as well as the above ignition and injection controls.

In more details, the injector 15 is constituted by a high pressure type swirl injector which facilitates atomization of the injected fuel by promoting the swirl thereof so as to improve the ignition performance. When the fuel injection is executed at the latter stage of the compression stroke, the injection angle becomes narrower below 30 degree. As a result, the diffusion of the atomized fuel is suppressed to prevent the fuel from adhering to the wall surface of the chamber 5. A stable concentration of the atomized fuel can be obtained around the ignition gap 16a to improve the ignition stability.

The chamber 5 is formed with a substantial downward slant surface from the center to the exhaust port side and a substantial horizontal surface in the intake port side to be a trapezoid configuration in section in a direction of piston stroke. The injector 15 is disposed at the peripheral portion to orient obliquely downwardly toward the exhaust side. With this arrangement, the injected and atomized fuel passes through in the vicinity of the ignition gap 16a while the fuel is prevented from reaching the wall surface of the chamber 5.

In this respect, conventionally, there was the following problem. In a combustion chamber of a pent roof type configuration, the intake and exhaust ports are formed on respective upper slant surfaces of the chamber and an ignition gap is located at substantially a top center of the chamber. An injector is positioned at a lower end portion of the slant surface in the intake port side. In this arrangement, an injector nozzle must be oriented obliquely and upwardly so that the injected fuel passes through in the vicinity of the ignition gap. However, if the fuel is injected upwardly, the injected fuel tends to reach and adhere to the slant wall surface of the chamber.

According to the present invention, as aforementioned, the chamber is of the trapezoid configuration in section in which the wall surface is slanted downwardly to the exhaust side and extends horizontally in the intake side. The injector 15 is mounted on the substantially vertical side wall surface in the intake port side of the chamber. The injection is made obliquely downwardly so as to pass through in the vicinity of the ignition gap 16a as well as suppressing the adherence of the atomized fuel.

In addition, the piston 3 is formed with the recess 26 on the top surface thereof. The recess 26 extends along the injecting direction of the fuel by the injector 15 and is getting deeper in the forward direction of the fuel injection. In other words, the recess is shallow in the intake side and deep in the exhaust side. The relationships between the configuration of the top surface of the piston 3 and operating conditions of engine including the injection of the fuel, the ignition timing and arrangements of the injector and ignition and configuration of the chamber (relationships between L, 11 and 12) are determined as aforementioned so as to prevent the injected fuel from being adhered to the wall surface of the chamber. The atomized Fuel 25 effectively stays in the recess 26 and upper space thereof. As a result, a stable combustion can be obtained.

Where the configuration of the chamber 5 is of the trapezoid in an axial direction of the cylinder 1, a volume of the chamber 5 tends to be increased to undesirably reduce the combustion ratio. With this arrangement of the chamber, the masks 32, 34 are formed to be extended inwardly from the circumferential wall portions between the adjacent ports. As a result, the volume of the chamber can be maintained as small as possible to avoid an undesirable low compression ratio. In particular, the masks 32 and 34 are provided on the high wall portions between both intake ports 6 and 7 and between the second intake port 7 and second exhaust port 9 respectively. Therefore, they contribute effectively to reduce the volume of the chamber 5.

In this case, although the wall 31 between the opening 6a of the first intake port 6 and the opening 8a of the first exhaust port 8 is high, no mask is provided there. Rather, the vertical wall 31 is of an arcuate configuration to smoothly introduce the intake air from the first intake port 6 circumferentially. Thus, the arrangement is effective to produce the swirl. On the other hand, although the wall portion between the both exhaust port openings 6a and 9a is low because the upper surface of the chamber is close to the lower end of the cylinder head 1, a mask is formed to have the wall 36 so that the volume of the chamber 5 can be reduced effectively. However, alternatively, the wall 36 may be of an arcuate configuration in conformity with the circumferential wall of the cylinder bore. With this arrangement, the swirl of the intake gas mixture can be effectively formed.

Figure 15:
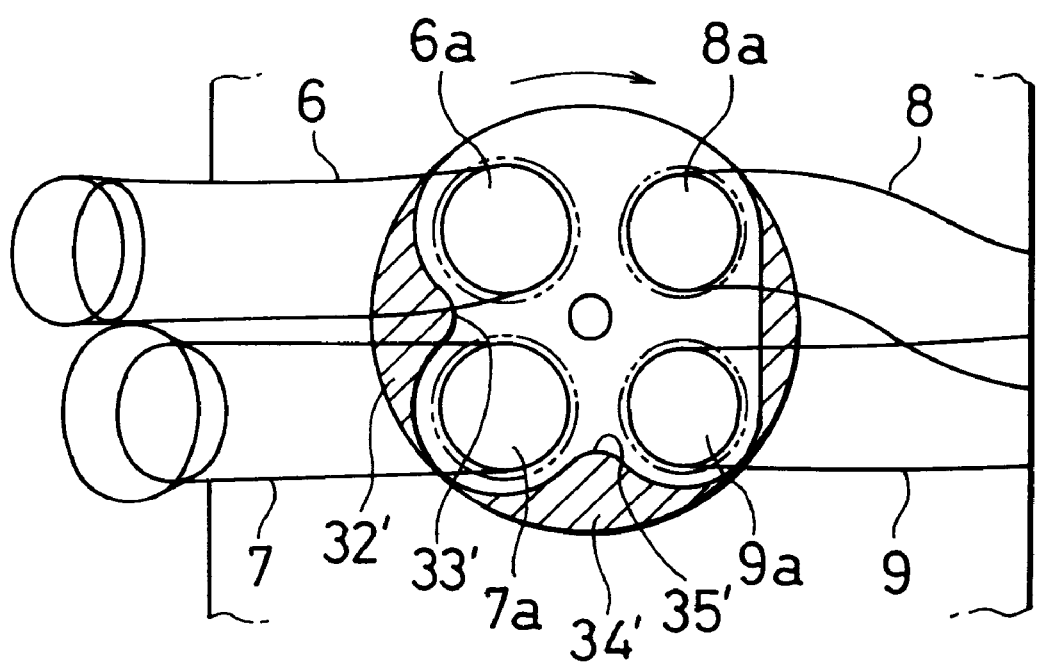
FIG. 15 is a schematic plan view showing another embodiment of the configuration of the combustion chamber.

As a modification of the masks 32 and 34, as shown in FIG. 15, the masks 32' and 34' are formed to be projected inwardly from the tangential lines of the valve rims to have arcuate lines in the plan view. With this arrangement, the more volume reduction can be obtained of the chamber 5.

In the area A, the injection is executed once in the area A1 in which the engine load is relatively low. However, in the area A2 in which the engine load is relatively high, the injection is executed twice to facilitate the laminar combustion.

If the fuel injection is executed only once in the area A2, the injected fuel not sufficiently atomized is too much concentrated around the gap 16a to deteriorate the ignitability and combustibility.

Figure 16:
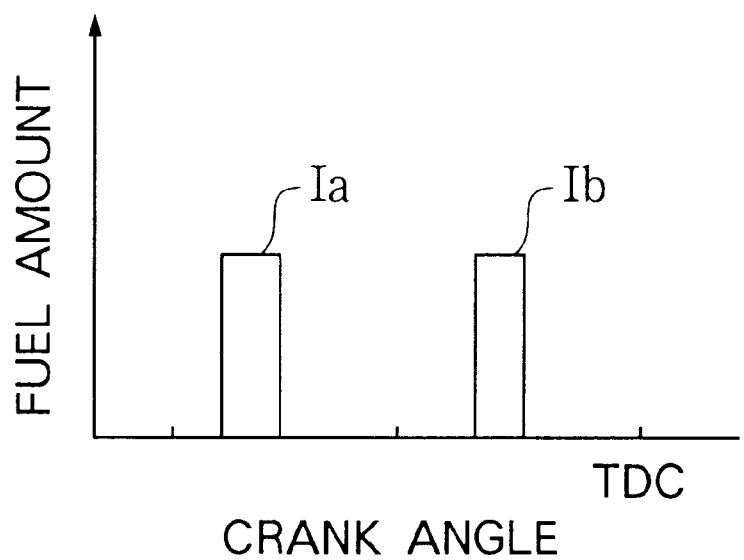
FIG. 16 is a view showing an injection timing and injection amount when the injection is made twice in the compression stroke.
Figure 17:
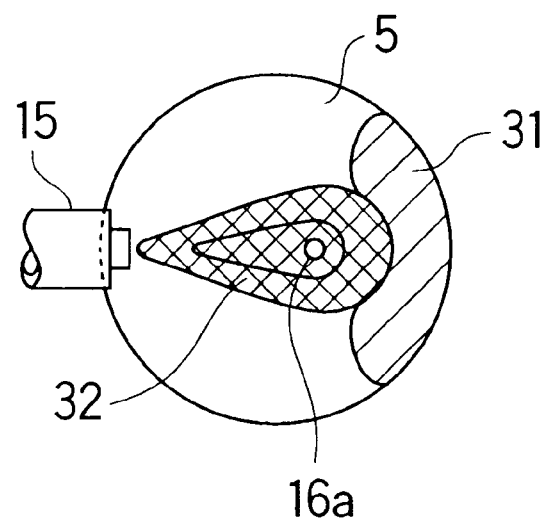
FIG. 17 is view showing a distribution of the injected fuel when the injection is made twice in the compression stroke.

On the other hand, if first and second fuel injections 1a and 1b are made in an early stage and a later stage in the compression stroke respectively, although the injected fuel reaches the wall surface of the combustion chamber 5 to adhere thereto as shown in FIG. 16, the fuel is vaporized and diffused before the ignition timing to form an appropriate air and fuel mixture 31 in an area between the ignition gap and the wall surface of the chamber 5. The second injection is made to satisfy the condition of L>11 with the same amount as that in a relatively low engine load condition so that the injected fuel forms an appropriate fuel and air mixture 32 around the gap 16a. The mixture 31 is continuously followed by the mixture 32 as shown in FIG. 17. As a result, a fine ignitability and combustibity can be maintained to improve the fuel consumption efficiency and the emission performance.

In this case, if the first injection is made in the intake stroke, the diffusion of the fuel is overly made to be excessively lean before the ignition timing resulting in a deterioration of the laminar combustion. Thus, it is preferred that the first injection is executed during the compression stroke.

The swirl control is made in accordance with the engine load and engine speed as stated in connection with FIGS. 10 and 11. In the low engine load condition, the swirl ratio is reduced to suppress an over diffusion and curve. As the engine load is increased, the swirl ratio is increased to facilitate the atomization and intermingling of the air and the fuel. As the engine speed is increased, the swirl ratio is reduced to suppress the over diffusion and curve.

In a full engine load and/or full engine speed condition, the injection from the injector 15 is made in the intake stroke. The fuel is diffused in the whole chamber uniformly to be combusted uniformly to improve an engine output performance.

In this case, if the high pressure injector is employed, the fuel injection is made with a wide injection angle. The injected fuel can be sufficiently diffused before the ignition timing. Thus, the uniform combustion is effected.

The recess 26 can be formed to be inclined a bit in a swirl direction as shown by a double dot chain line in FIG. 3.

Figure 18:
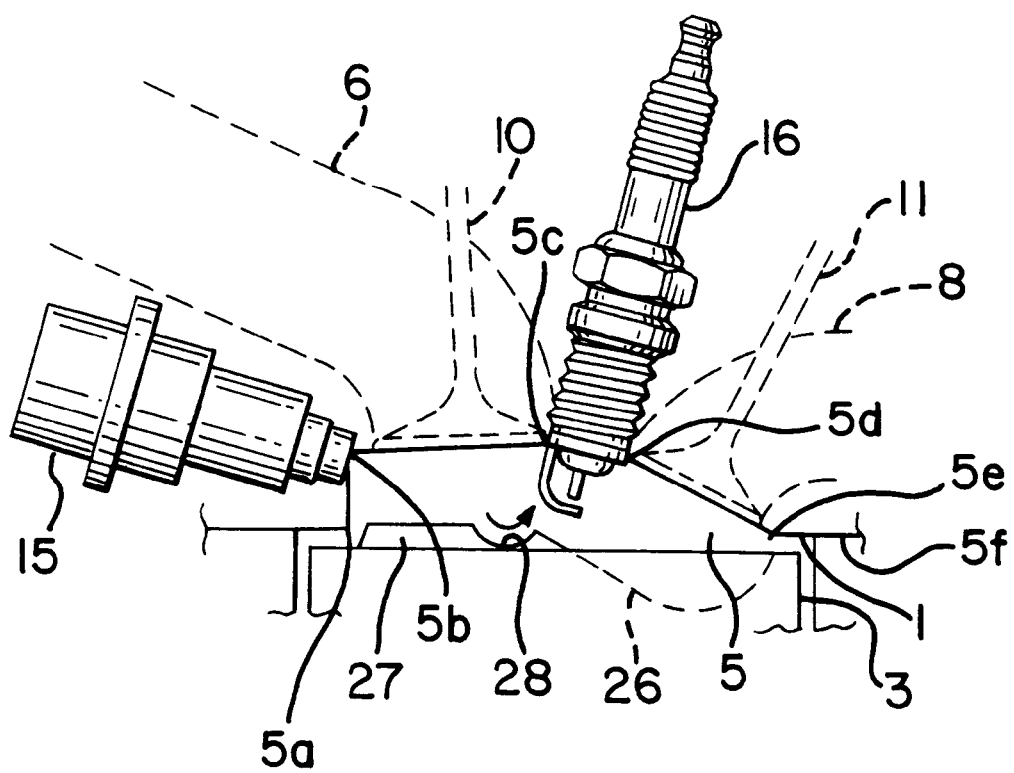
FIG. 18 is a sectional view showing another embodiment of the present invention.

Alternatively, as shown in FIG. 18, a shelf portion 28 may be formed on the top surface of the piston 3 between the raised portion 27 and recess 26 so that a part of the fuel is hit on the shelf portion 28 to be effectively introduced toward the ignition plug 16. In this arrangement, it is advantageous in that a projection amount of the nozzle of the injector 15 can be reduced. The trapezoid shape of the chamber in section is formed by the cylinder head roof shown outlined through points 5a, 5b, 5c, 5d and 5e and completed with horizontal plane shown through points 5a and 5e. Points 5a and 5e lie in the plane defined by joint or common surface 5f between the cylinder head and the cylinder block.

Figure 19:
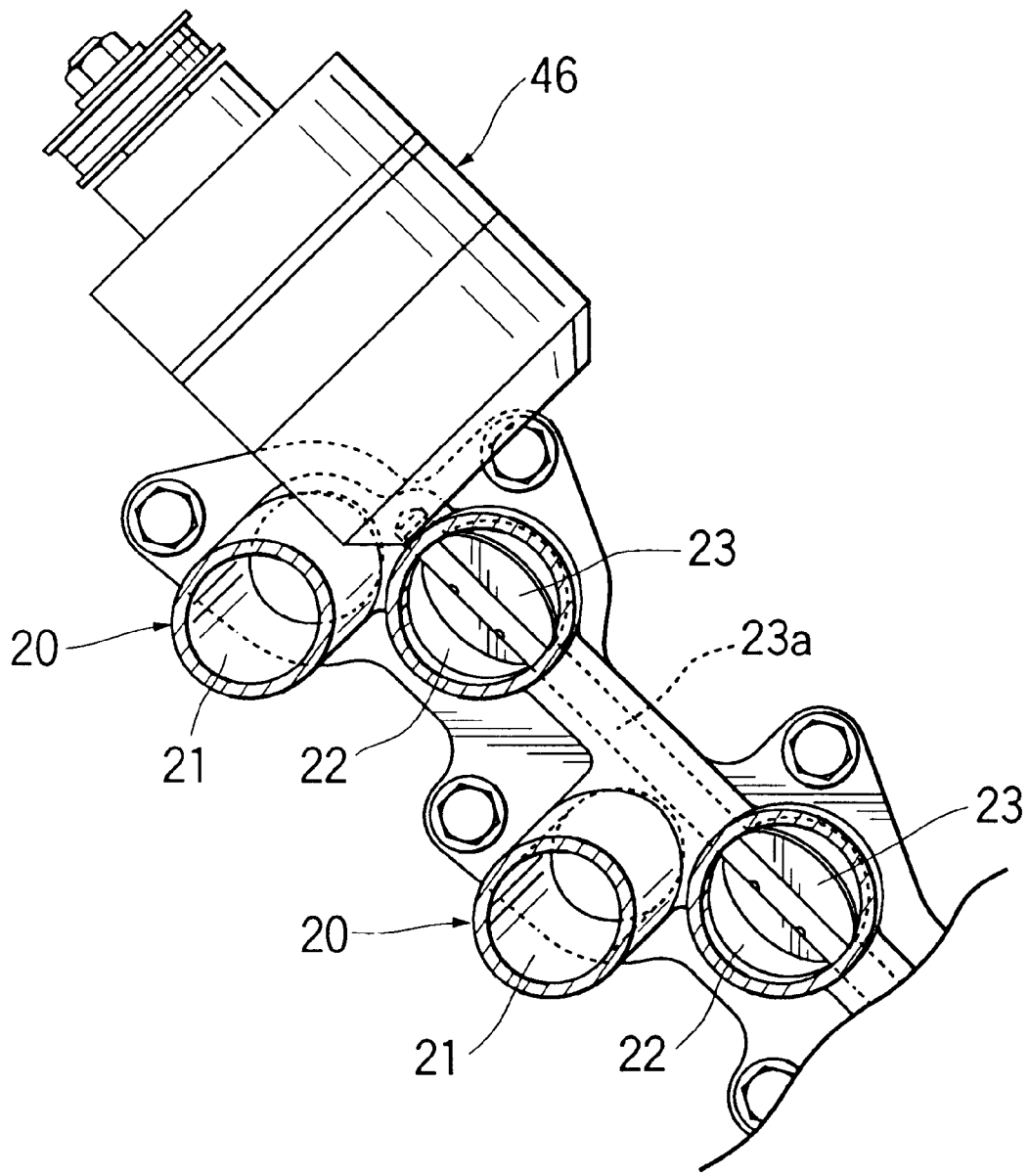
FIG. 19 is a sectional view taken along a line perpendicular to a axial line of intake ports.

Referring to with FIG. 19, the fuel pump 46 is disposed by the first and second intake passages 21 and 22. With this arrangement, the fuel pump 46 is disposed close to the injector 15 so that a fuel supply tube can be shortened. In addition, the pump 46 is arranged above the intake passages 21 and 22 so that a maintenance of the pump 46 can be readily made.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A direct injection engine provided with an injector at a peripheral portion of a combustion chamber to inject fuel at least at a latter stage of a compression stroke in at least a low engine load and low engine speed condition, said injector being oriented to discharge fuel toward a common surface joining the cylinder head with the cylinder block, said common surface being at an opposite end of the combustion chamber from said injector, wherein;

a distance from the tip end of the injector to said common surface at the opposite end of the combustion chamber is greater than a traveling distance of the injected fuel for a time period from a start of a fuel injection at the latter stage of the compression stroke to the time of firing of the ignition spark, wherein;

an ignition plug is arranged that an ignition gap is disposed within an injection area of the injector; and, wherein a distance from the tip end of the injector to the ignition gap is determined smaller than said traveling distance of the injected fuel.

2. A direct injection engine as recited in claim 1 comprising;

a piston disposed in a cylinder bore of a cylinder block, a ceiling portion defining an upper portion of the combustion chamber formed in a cylinder head to be extended upwardly in a cylinder head from said common surface of the cylinder head and the cylinder block, said ceiling portion extending downward to a lower surface of the cylinder head, a slant surface formed in the ceiling portion extending downwardly in an exhaust port side of the combustion chamber, a parallel surface being formed in the ceiling portion and extending in a substantially parallel direction with said common surface along an intake port side to form a trapezoid configuration of the combustion chamber in a section defined by the ceiling portion and a horizontal plane parallel to and passing through the lower surface of the cylinder head, and, the injector being arranged to inject fuel in a direction obliquely downwardly into said combustion chamber.

3. A direct injection engine as recited in claim 2 comprising a recess formed on the top surface of the piston, the recess extending and getting deep and wide along an injecting direction, and greater than a size of the injected fuel with regard to a direction perpendicular to the injecting direction of the injector; and the distance from the tip end of the injector to an opposite wall of the combustion chamber in the injecting direction being greater than said traveling distance of the injected fuel for the time period between the injection start in the latter stage of the compression stroke and the ignition timing.

4. A direct injection engine as recited in claim 3 wherein a raised portion extended upwardly is formed on the top surface of the piston closer to an intake port than the recess.

5. A direct injection engine as recited in claim 4 wherein a shelf portion is formed on the top surface of the piston between the raised portion and the recess.

6. A direct injection engine as recited in claim 1 wherein an injection angle of the injector is not greater than approximately 30 degrees when the injection is made at the latter stage of the compression stroke.

7. A direct injection engine as recited in claim 1 wherein the injection angle of the injector is not greater than approximately 30 degrees when the injection is made in an low engine load and low engine speed at the latter stage of the compression stroke, and wherein the injection angle is increased in a high engine load and high engine speed.

8. A direct injection engine as recited in claim 4 wherein the injection angle of the injector is reduced as an atmospheric pressure is increased, and wherein an injection timing of the injector is determined in accordance with an engine operating condition so that the injection is made at the latter stage of the compression stroke in the low engine load and low engine speed and is made at an intake stroke in the high engine load and high engine speed.

9. A direct injection engine as recited in claim 1 wherein the injection is executed at an early stage and latter stage of the compression stroke in a middle engine load condition.

10. A direct injection engine as recited in claim 1 further comprising a gas flow control means for enhancing a gas flow in the combustion chamber when the injection is made in the compression stroke.

11. A direct injection engine as recited in claim 1 wherein the gas flow control means includes a swirl producing means for producing a swirl of an air fuel mixture when the injection is made at the latter stage of the compression stroke so that a swirl ratio in the high engine load condition is greater than that in the low engine load condition.

12. A direct injection engine as recited in claim 10 wherein the gas flow control means includes a swirl producing means for producing a swirl of an air fuel mixture when the injection is made at the latter stage of the compression stroke so that a swirl ratio in the high engine speed condition is smaller than that in the low engine speed condition.

13. A direct injection engine as recited in claim 10 wherein the gas flow control means comprises a first intake port for producing the swirl, a second intake port for producing a tumble and a swirl control valve for opening and closing the second intake port.

14. A direct injection engine as recited in claim 13 wherein an opening of the swirl control valve is increased to reduce the swirl ratio and is decreased to increase the swirl ratio.

15. A direct injection engine as recited in claim 2 wherein the combustion chamber is defined by a top surface of a piston disposed in a cylinder bore formed by a cylinder block and a lower surface of a cylinder head, a first and second intake ports being extended and opened to the ceiling portion of the combustion chamber side by side, a first and second exhaust ports being extended and opened to the ceiling portion of the combustion chamber side by side, the first and second intake and first and second exhaust valves for opening and closing said first and second intake and first and second exhaust ports respectively, an injector mounted on the cylinder head for directly injecting a fuel into the combustion chamber, an ignition plug mounted on the cylinder head, the intake and exhaust valves being arranged in a manner that an inclination of an axis of the intake valves being smaller than that of the exhaust valves with regard to an axis of the cylinder bore, wall surfaces of the combustion chamber in an intake port side and exhaust port side being perpendicular to the axes of the intake and exhaust valves respectively, the configuration of the combustion chamber being of a substantially trapezoid in section, the injector being disposed in a lower portion of the cylinder head in the intake port side, the first intake port being directed to a circumferential direction of the combustion chamber, a vertical wall portion of the combustion chamber between the first intake port and the first exhaust port adjacent to the first intake port being arcuate in conformity of a wall surface of the cylinder bore, and, vertical wall portions of the combustion chamber between the first and second intake ports and between the second intake port and second exhaust port adjacent to the second intake port being extended inwardly from an outer common tangential line of valve rims adjacent to each other in a plan view.

16. A direct injection engine as recited in claim 15 wherein the vertical wall portions between the first and second exhaust ports is extended so as to accord to the outer common tangential line of the valve rims of the exhaust valves.

17. A direct injection engine as recited in claim 15 wherein the vertical wall portions between the first and second exhaust ports is arcuate in conformity with the wall surface of the cylinder bore.

18. A direct injection engine as recited in claim 15 wherein a valve driving mechanism of DOHC in which an intake and exhaust cam shafts are extended in parallel with each other, one of the cam shafts being driven by a crank shaft through a transfer means, and, the cam shaft being operably connected by a pair of gears.

19. A direct injection engine comprising a piston disposed in a cylinder bore of a cylinder block, a ceiling portion defining an upper portion of the combustion chamber formed in a cylinder head extending upwardly in the cylinder head from a common surface of the cylinder head with the cylinder block, an intake port and exhaust port formed in the cylinder head in the ceiling portion of the combustion chamber, intake and exhaust valves for opening and closing the intake and exhaust ports, an injector mounted in the cylinder head for directly injecting a fuel into the combustion chamber, an ignition plug mounted in the cylinder head, the intake and exhaust valves being arranged in a manner that a deviation of an axis of the intake valve being smaller than the deviation of the exhaust valve with regard to a vertical axis through the center of the cylinder bore, wall surfaces of the combustion chamber in an intake port side and exhaust port side being perpendicular to the axes of the intake and exhaust valves respectively, a side wall portion extending downwardly from the wall surface of the combustion chamber on the intake port side, a tip end of the injector being disposed in the side wall portion in the intake port side, and the intake port being provided between the injector and the axis of the intake valve to be extended obliquely upwardly from the combustion chamber to a side portion of the cylinder head.

20. A direct injection engine as recited in claim 19 wherein the intake port comprises a first intake port for producing a swirl of an intake gas and a second intake port for producing a tumble of the intake gas.

21. A direct injection engine as recited in claim 20 wherein angles of the first and second intake ports to the combustion chamber are substantially the same at the openings, the second port being extended more uprightly than the first port in an upstream portion, and, a gate valve being provided in the second port in an upstream position.

22. A direct injection engine as recited in claim 19 wherein the improvement further comprises a valve driving mechanism of DOHC in which an intake and exhaust cam shafts are extended in parallel with each other, the exhaust cam shaft being disposed lower than the intake cam shaft with regard to the axis of the cylinder bore, the exhaust cam shaft being driven by a crank shaft through a transfer means, and, the intake cam shaft being driven by the exhaust cam shaft through a transmitting means.

23. A direct injection engine as recited in claim 22 wherein the transmitting means comprises a pair of gears.

24. A direct injection engine as recited in claim 19 wherein the improvement further comprises a valve driving mechanism of DOHC in which an intake and exhaust cam shafts are extended in parallel with each other, the exhaust cam shaft being disposed lower than the intake cam shaft with regard to the axis of the cylinder bore, the intake cam shaft being driven by a crank shaft through a transfer means, the exhaust cam shaft being driven by the intake cam shaft through a transmitting means, the engine being so arranged that the cam shafts are extended transversely in a vehicle and, the intake cam shaft being located at a rear side compared with the exhaust cam shaft in a longitudinal direction of the vehicle.

25. A direct injection engine as recited in claim 24 wherein the transmitting means comprises a pair of gears.

* * * * *